United States Patent [19]
Jayachandra

[11] 3,842,277
[45] Oct. 15, 1974

[54] INFRARED SCANNING APPARATUS USING A PLURALITY OF PARALLEL DETECTORS

[75] Inventor: Yemmanur Jayachandra, Bolingbrook, Ill.

[73] Assignee: Western Electric Company, Incorporated, New York, N.Y.

[22] Filed: June 25, 1973

[21] Appl. No.: 373,348

[52] U.S. Cl................ 250/341, 250/349, 250/360
[51] Int. Cl............................................. G01t 4/16
[58] Field of Search .......... 250/338, 339, 340, 341, 250/347, 348, 349, 350, 351, 353, 360, 330, 334; 73/355 R

[56] References Cited
UNITED STATES PATENTS
| | | | |
|---|---|---|---|
| 3,430,045 | 2/1969 | Bjork et al..................... | 250/340 X |
| 3,451,254 | 6/1969 | Maley............................ | 250/339 X |

*Primary Examiner*—James W. Lawrence
*Assistant Examiner*—Davis L. Willis
*Attorney, Agent, or Firm*—R. A. Lloyd

[57] ABSTRACT

A beam of infrared energy, directed onto an incremental area of a surface of an article to heat the area, is scanned in a predetermined pattern across the surface of the article. As the beam scans across the surface, the thermal response of two or more scanned incremental areas, adjacent to the heated area, is detected, and electrical signals are generated in accordance therewith. The electrical signals are applied to individual inputs of a multi-gun cathode ray tube, the electron beams of which are scanned in the predetermined pattern, and in the same spatial relationship as the detected incremental areas, throughout their entire raster, to generate on the screen thereof a thermal diffusogram of the surface of the article.

15 Claims, 2 Drawing Figures

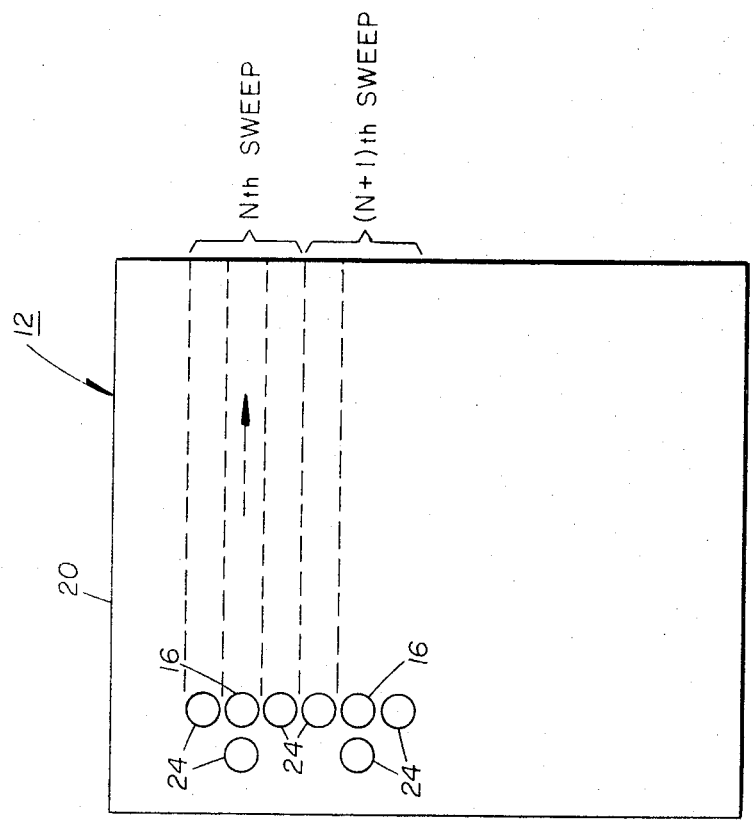

INFRARED SCANNING APPARATUS USING A PLURALITY OF PARALLEL DETECTORS

BACKGROUND OF THE INVENTION

1. Field of the Invention

The present invention relates to methods and apparatus for exploring an article with infrared radiation, and in particular to methods and apparatus for scanning a beam of radiation across a surface of the article while simultaneously detecting the thermal response of a number of individual areas on the surface adjacent to the scanned area.

2. Description of the Prior Art

In many manufacturing and testing operations, it is desirable to be able to determine certain characteristics of an article without dismantling it, particularly if destruction of the article would result in the dismantling process. For example, if an electronic circuit, of a type having internal conductors which are not available for visual inspection, is tested and found to be defective as a result of an open or shorted internal conductor, it might be possible to repair the circuit if the exact location of the defect, or failure, is known. Since metal conductors, electronic hardware, insulating material, etc., of a circuit generally have differing thermal conductivities, the circuit may be analyzed for detection of the location of the defect by heating the circuit, and by then sensing the thermal response of the surface of the circuit to the heating. Since the various portions internal of the circuit exhibit varying thermal conductivities, heat will be carried to or away from the overlying surface in accordance therewith, and the thermal response of the surface of the circuit may, therefore, be analyzed to determine the inner construction of the circuit, and the location of defects.

Known devices for sensing the thermal response of an article are generally of the surface scanning type, wherein the article is first heated with a source of energy, and the thermal response of a surface thereof is then detected with an appropriate detector. One such type of device employs a beam of energy to heat the surface of an article, and a single thermal response detector which is scanned over the surface to determine the thermal response thereof. By using a single detector scanning at practical rates, it is possible to miss certain important areas on the surface where the characteristics thereof should be noted. If, with this type of detector, the scan lines are spaced more closely together to obtain more detailed information, then the time required to scan the entire surface will be increased. To compensate for the increase in scan lines, in order to bring the total scan time within reasonable limits, the scan rate cannot arbitrarily be increased, as increasing the scan rate results in a loss in the effective signal-to-noise ratio. Furthermore, detecting surface thermal responses with a single detector is not practical, because of the difficulty of deriving thermal diffusograms therefrom, with sufficient accuracy and resolution for practical applications.

SUMMARY OF THE INVENTION

In accordance with the present invention, a non-contacting apparatus for detecting a characteristic of an article includes optics for transferring heat to an incremental area of a surface of the article to heat the area, and at least two heat detectors, each for detecting the thermal response to an individual incremental area of the surface adjacent to the heated area, and for generating a signal in accordance therewith. Also provided is mechanism for moving the heat transfer optics and the heat detectors in unison with each other, and relative to the surface of the article, to scan the heat transfer optics and the detectors over the surface of the article, so that the signals of the heat detectors vary in accordance with the thermal responses of the scanned incremental areas. An output device receives the signals from the heat detectors.

Preferably, the apparatus is for detecting a thermal characteristic of an article, the heat transfer optics focus radiation from a source of radiation into a beam for projection onto an incremental area of the surface of the article to heat the article and, by the thermal conduction of the article, to heat the surrounding area, and the thermal response is detected with at least two radiometers, each for sensing radiation and for generating an electrical signal which varies in accordance with the intensity thereof. Also included are optics for focusing an image of an individual incremental area of the surface of the article adjacent to the heated area along a path and onto an associated radiometer, so that the electrical signal generated by each radiometer is in accordance with the radiation emitted by its detected incremental area. A multi-bladed chopper is positioned for rotation across both the optical paths of the radiometers and the path of the beam of radiation to intermittently interrupt both the beam of radiation and the optical paths to the radiometers.

To enable the plurality of individual incremental areas on the surface of the article to be heated, and to detect the thermal response of a plurality of incremental areas adjacent to the heated area, first and second plane mirrors are each positioned in both the path of the beam of radiation, and in the optical paths of the radiometers, and are each adapted for oscillating movement in a direction which is orthogonal with respect to the other, to sweep the beam of radiation, and the image focused on each radiometer, in a predetermined pattern across the surface of the article and in a fixed spatial orientation with each other. In this manner, the electrical signals from the radiometers are in accordance with the radiation emitted by the incremental areas swept by the optical paths of the radiometers.

To obtain a visual indication of the thermal response of the surface of the article upon being swept by the beam of radiation, a multi-gun cathode ray tube, each gun of which is for generating a point image which varies in brightness in accordance with the signal from an individual one of the radiometers, has the point images thereof swept across the screen thereof in one direction by an x-deflection circuit, and in an orthogonal direction by a y-deflection circuit. To synchronize the sweep of the point images across the screen of the cathode ray tube with the sweep of the optical paths of the radiometers across the surface of the article, the x-deflection circuit provides a signal to a first piezoelectric device which imparts oscillating movement to a first one of the plane mirrors in accordance therewith, and the y-deflection circuit provides a signal to a second piezoelectric device which imparts oscillating movement to the second one of the plane mirrors in accordance therewith. In this manner, as the point images are swept across the screen of the cathode ray tube in synchronism with the sweep of the optical paths of the radiometers across the surface of the article, and as the electrical signals from the radiometers vary in accordance with the radiation emitted by the scanned incremental areas, the brightness of the point images varies in accordance therewith to form on the screen of the cathode ray tube a thermal diffusogram of the surface of the article.

Other objects, advantages and features of the invention will be apparent upon consideration of the following detailed description when taken in conjunction with the appended drawings.

BRIEF DESCRIPTION OF THE DRAWINGS

FIG. 2 illustrates the orientation of a heated incremental area on the surface of the article with respect to incremental areas at which thermal responses are detected, and the manner in which the areas are scanned across the surface of the article.

DETAILED DESCRIPTION

Figure 1:
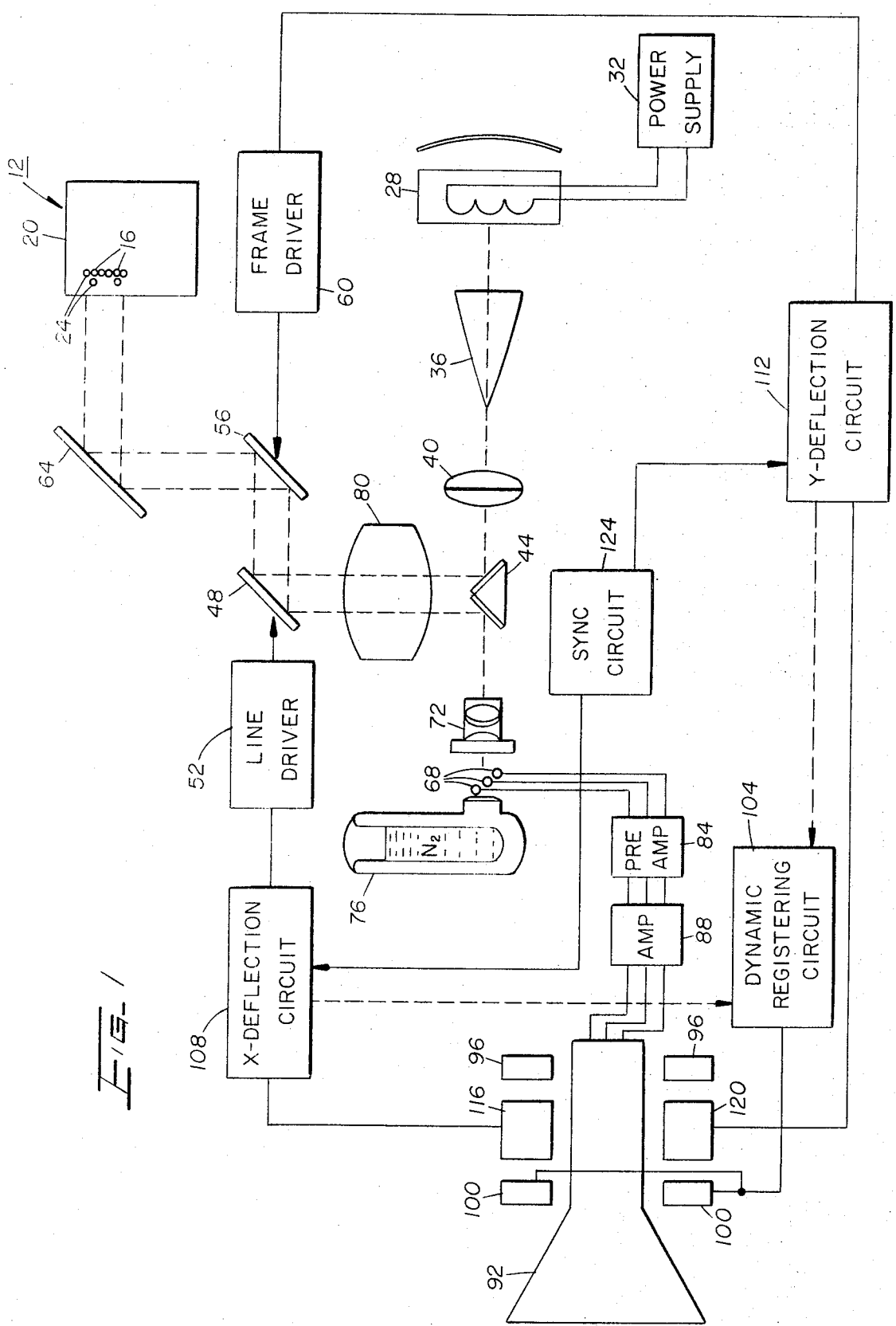
FIG. 1 shows apparatus for generating a thermal diffusogram of a surface of an article in accordance with the teachings of the invention.

Referring to FIG. 1, apparatus is shown for determining a thermal characteristic of an article, or workpiece 12, by focusing a beam of radiant energy onto an incremental area, or heating spot 16, on a surface 20 of the workpiece 12, and by then scanning, or sweeping, the beam of radiant energy, and therefore the heating spot 16, across the surface 20 in a predetermined pattern. The thermal response of the workpiece 12 to the heating spot 16 is detected by at least two exploring spots 24 (three exploring spots 24 being employed in the exemplary embodiment of the invention as shown in FIG. 1), which are images of individual incremental areas of the surface 20, adjacent to the heating spot 16, each of which is focused onto an associated thermal detecting device through appropriate optical means. The exploring spots 24 are scanned in synchronism with the heating spot 16, and in a fixed spatial relationship with each other and with the heating spot 16, across the surface 20 of the workpiece 12, and detect variations in temperature, or radiation emissivity, of the explored areas in response to the workpiece being heated on the adjacent incremental area of its surface by the heating spot 16. That is, the exploring spots 24 detect temperature variations of the incremental areas adjacent to the heated incremental area as the exploring spots 24 and heating spot 16 are scanned across the surface 20 of the article 12. As shown in FIG. 2, the centers of the exploring spots 24 are successively positioned at essentially 90° increments with respect to the center of the heating spot 16, and no more than one of the exploring spots detects the incremental areas which have been directly heated by the heating spot.

When an incremental area of the surface 20 of the workpiece 12 is scanned by the heating spot 16, thermal energy is conducted into the workpiece 12, and the temperature of each explored incremental area is dependent upon the rate at which heat is conducted through the workpiece 12. The magnitude of the temperature of the explored areas is largely dependent upon the type of material out of which the workpiece is constructed; however, variations in temperature will be effected if there are discontinuities in the structure of the material, or if material of differing types, with differing thermal conductivities, is employed in the workpiece. In the case of the workpiece 12 being an electronic circuit, having internal conductors molded within an insulating material, to be explored by the apparatus of the invention, the insulating portion of the circuit will absorb more heat from the heating spot than the conductors, and will therefore reach a higher temperature, and emit more radiation to be detected, than will a conductor. Conversely, a conductor will absorb less heat than an insulating portion of the circuit, and will therefore emit less radiation to be detected. Thus it is seen that the radiation emitted by the surface of the workpiece 12, and detected with the exploring spots 24, is a function of the thermal characteristics of the workpiece 12 immediately at and adjacent to the exploring spots.

The thermal detecting devices, or radiation pickup devices, may be radiometers, and each generates an electrical signal in accordance with the intensity of the radiation detected thereby, or, in accordance with the temperature of an associated incremental area of the surface, the image of which is focused thereon. Therefore, the electrical signal generated by each radiometer is a function of the temperature of the incremental area being detected thereby.

To obtain an indication of the heating experienced by the surface 20 of the workpiece 12 when the surface is scanned with the heating spot 16, and in the present invention to obtain a thermal diffusogram of the surface 16, the electrical signal generated by each thermal detector is applied, through appropriate circuitry, to individual control grids of a multi-gun cathode ray tube to control the intensity of the electron beam provided by an associated gun. In this manner, an individual, variable brightness point image, which is the point at which the electron beam from a gun strikes the screen, or face, of the cathode ray tube, is generated on the screen of the tube for each exploring spot 24, and varies in brightness in accordance with the value of the electrical signal generated by the thermal detector associated with that exploring spot. Therefore, the brightness of each point image is a function of the temperature, or radiation emission, detected at an incremental area on the surface 20 of the workpiece 12 by its associated exploring spot 24. The thermal diffusogram of the surface 20 is then obtained on the screen of the cathode ray tube by adjusting the point images generated by each electron beam into the same spatial registry as their associated exploring spots, and by scanning the electron beams across the screen of the tube in the same pattern as that of the exploring spots 24 across the surface 20, and in synchronism therewith.

The exploring spots 24 are focused onto incremental areas on the surface 20 of the workpiece 12 in an arrangement which permits the entire surface 20 to be explored with a minimum scanning effort. With three thermal detectors, and with the arrangement of the exploring spots 24 with respect to the heating spot 16 as is best shown in FIG. 2, it is seen that if the surface 20 is scanned in lines and frames, similar to the scan of a raster on the screen of a television monitor, then the number of scan lines required to completely explore the surface 20 is only one-third of the number that would be required if only one thermal detector, and therefore only one exploring spot 24, were employed. It is to be appreciated that this arrangement similarly diminishes to one-third the number of lines which must be scanned with the heating spot 16 to obtain maximum thermal information from the surface 20, which permits thermal memories and interferences from closely spaced scans with the heating spot 16 to be neglected, as well as enabling the least amount of heat to be put into the workpiece for obtaining the maximum amount of information from the workpiece.

More particularly, in practicing the present invention the radiation output from a source of infrared (IR) radiation 28 is controlled in intensity by a conventional, variable power supply 32, and is focused into a point source with a collector lens 36. The collector lens 36 is essentially a bullet-shaped lens with a flat base and a narrow, pointed tip, and in the instant case is made of high refracting IR transmitting materials such as sapphire, quartz or barium fluoride. IR radiation falling on the base of the lens 36 is internally reflected from the walls of the lens and is transmitted to its tip as a point source. A convex lens 40, positioned at its focal distance from the tip of the collector lens 36, receives the IR radiation from the collector lens 36 and collimates the radiation into a narrow beam.

The collimated beam of radiation passing from the convex lens 40 is reflected by one surface of a wedge-shaped reflector 44 onto a line scanning plane mirror 48. The line scanning plane mirror 48 is oscillatingly driven by a line driver oscillator 52 through an electromechanical transducer, such as a piezoelectric crystal, and oscillates, in response to a controlled input to the oscillator, 12 thousand times per second in the $x$-direction to scan, or sweep, 12 thousand lines per second, in the $x$-direction, with the beam of radiation on the surface 20 of the workpiece 12. The line scanning plane mirror 48, as well as the piezoelectric device and line driver oscillator 52, may be an integral optical scanning unit, such as a Model No. G-0606 unit sold by General Scanning, Inc., of New York, N.Y. The line scanning plane mirror 48 reflects the beam of radiation onto a frame scanning plane mirror 56, which is oscillatingly driven by an oscillator 60 through an electromechanical transducer, such as a piezoelectric crystal, and oscillates, in response to a controlled input to the oscillator, 60 times per second in the $y$-direction to scan, or sweep, 60 frames per second, in the $y$-direction, with the beam of radiation on the surface 20 of the workpiece 12. The frame scanning plane mirror 56, as well as the piezoelectric device and the frame driver oscillator 60, may be an integral optical scanning unit, such as a Model No. G-330 unit also sold by General Scanning, Inc.

The frame scanning plane mirror 56 reflects the now $x$ and $y$ scanning IR radiation beam onto a stationary plane mirror 64, which in turn reflects the beam onto the surface 20 of the workpiece 12 (shown rotated 90° to facilitate illustration thereof) for providing on an incremental area thereof the heating spot 16 which is scanned in an $x$ and a $y$ direction, or in lines and frames, across the surface 20.

To detect the thermal response of the incremental areas, or explored spots 24, adjacent to the heated incremental area, or heating spot 16, an image of each exploring spot 24, and therefore the radiation emitted from each exploring spot 24, is transmitted to an individual thermal detecting device 68 through the use of a portion of the optics which were employed to transmit the beam of radiation to the workpiece. That is, the images of the exploring spots 24 are transmitted to the detectors 68 by the plane mirror 64, the frame driver mirror 56, the line driver mirror 48, and a second reflective side of the wedge-shaped reflector 44. A detection focusing optics 72, such as two germanium plano convex lenses, is positioned between the second reflective side of the wedge-shaped reflector 44 and the thermal detectors 68 to focus the image of each exploring spot 24 onto each one of the IR detectors 68. The IR detectors 68 are placed at the image plane of the detection focusing optics 72, and are positioned such that their spatial registry corresponds with that of the three desired exploring spots 24 adjacent to the heating spot 16. The thermal detectors 68 are each Model No. DLK-39 mercury cadmium telluride infrared detectors sold by Honeywell, Corp., of Minneapolis, Minn., and are cooled by a source of liquid nitrogen 76 for proper operation. Accordingly, as each of the detectors 68 is identical, each detector responds to radiation within the same, or within a predetermined, range of radiation wavelengths.

It should be noted at this point that since the same optical scanning devices, that is, the line driver plane mirror 48 and the frame driver plane mirror 56, are employed to scan both the beam of IR radiation, and the images detected by the thermal detectors 68, across the surface 20 of the workpiece 12, the exploring spots 24 and the heating spot 16 will always be in a fixed spatial registry as they are scanned across the surface 20.

Each thermal detector 68 generates an electrical signal which corresponds to the temperature of, or the intensity of the radiation in the same range of wavelengths emitted from, its associated explored incremental area on the surface 20 of the workpiece 12. Therefore, as the exploring spots 24 are scanned across the surface 20, the electrical signals from the detectors 68 are a function of the thermal characteristics exhibited by the surface 20. To improve the signal-to-noise ratio of the electrical signals generated by the thermal detectors 68, and to minimize thermal memory effects, an energy chopper 80 is positioned between the wedge-shaped reflector 44 and the line driver plane mirror 48, in the path of the beam of IR radiation and in the optical path of the images detected by the detectors 76, to intermittently interrupt, or chop, both the beam of radiation incident on the surface 20 and the images incident on the thermal detectors 68. The energy chopper 80 may be a conventional apertured wheel or multibladed chopper driven by a synchronous motor, the only requirement being that the chopper 80 operate at a sufficiently high speed such that closely spaced tangential heating and exploring spots be obtained across a scanned line.

To obtain a visual representation, or thermogram, of the thermal characteristics of the surface 20 of the workpiece 12, the electrical signal from each thermal detector 68 is applied through a preamplifier 84 and an amplifier 88 to an individual control grid of a conventional multi-gun, or tri-gun, video display 92, such as a tri-gun cathode ray tube, for controlling the brightness of the individual electron beams on the screen of the tube in accordance with the value of the signals. In other words, each electron beam is associated with, and controlled in intensity by, the radiation emission on the surface 20 of the workpiece 12 as detected by an associated exploring spot 24.

The three electron spots, or variable brightness point images, on the screen of the display 92 are maintained in a fixed spatial registry, corresponding to the spatial registry of their associated exploring spots 24, through the use of three static register magnets 96 (only two of which are shown), located at the first grids of the guns, and three dynamic register magnets 100 (only two of which are shown), located at the final anodes of the guns. The dynamic register magnets 100 derive their correcting voltages from a dynamic registering circuit 104, which senses an output from both an x-deflecting, or line scanning, circuit 108, and from a y-deflecting, or frame scanning, circuit 112. The x-deflection circuit 108 drives a deflection coil 116 to scan raster lines on the screen of the display 92 in an x-direction at a rate of 12 thousand lines per second, and the y-deflection circuit 112 drives a deflection coil 120 to scan raster frames on the screen of the display 92 in a y-direction at a rate of 60 frames per second.

The x-deflection circuit 108 also provides the controlled input to the line driver circuit 52, which oscillates the line scanning plane mirror 48 in the x-direction at the rate of 12 thousand oscillations per second, and the y-deflection circuit 112 similarly provides the controlled input to the frame driver circuit 60, which oscillates the frame scanning plane mirror 56 in the y-direction at the rate of 60 oscillations per second. It is seen, therefore, that the exploring spots 24, and heating spot 16, must scan lines and frames on the surface 20 of the workpiece 12 at the same rate that the electron beams scan lines and frames on the screen of the display 92.

Since the scan rates of the electron beams and of the exploring and heating spots are identical, and since the point images on the screen of the display, formed by the electron beams, vary in brightness in accordance with the temperature of incremental areas of the surface 20 as detected by the exploring spots 24, it is only necessary to synchronize the initiation of the scans, and the location at which the scans begin both on the surface 20 and on the screen of the display device 92, to obtain on the screen of the display device an image which is a thermogram of the surface 20. That is, by synchronizing the initiation of the scans, and the position at which the scans begin both on the surface 20 and on the screen of the display device 92, the three point images form on the screen of the display device three separate visual images, each of which is representative of the heating detected on the surface 20 by an associated one of the detectors 68, which images, taken together, form a composite thermogram of the surface 20. This synchronization is accomplished with a synchronization circuit 124, which is a common cathode relaxation oscillator, and which intermittently provides an input to both the x-deflection circuit 108 and to the y-deflection circuit 112 to ensure that the circuits always reset at the same time.

Since three lines are simultaneously scanned with the apparatus of the invention, three times more information is displayed with the present apparatus, for every scan, than with conventional apparatus employing a single gun display. This permits a higher resolution difusogram to be obtained with faster display times, and enables the heating spot to be sparsely spaced to minimize thermal interferences from previous scans.

While one embodiment of the invention has been described in detail, it is understood that various other modifications and embodiments may be devised by one skilled in the art without departing from the spirit and scope of the invention.

What is claimed is:

1. In a noncontacting apparatus for detecting a characteristic of an article:
    means for transferring heat to an incremental area of a surface of the article to heat the area;
    at least two heat detector means, each for detecting the thermal radiation response in the same range of radiation wavelengths of a separate one of at least two discrete incremental areas of the surface externally of the heated area, and for generating a signal in accordance therewith;
    means for scanning the heat transfer means and the heat detector means in unison with each other and over the surface of the article to generate signals from the heat detector means which vary in accordance with the thermal radiation responses, in the same range of radiation wavelengths, of the scanned incremental areas, and
    output indicator means for receiving the signals from the heat detector means.

2. In the noncontacting apparatus as set forth in claim 1, wherein:
    the means for transferring heat to an incremental area of the surface to heat the area includes means for directing a beam of infrared radiation onto the area, and
    the heat detector means includes individual pickup means which are each responsive to the detected infrared radiation, in the same range of radiation wavelengths, from a separate one of the incremental areas for generating a signal in accordance therewith, the signal being a function of the heat transfer characteristic of the article at the detected incremental area.

3. In the noncontacting apparatus as set forth in claim 2, wherein the means for scanning the heat transfer means and the heat detector means over the surface of the article includes optical scan means, coupled with both the beam of infrared radiation and the pickup means, for scanning the beam of infrared radiation and the pickup means across the surface of the article in a predetermined pattern and in unison with each other.

4. In the noncontacting apparatus as set forth in claim 3, wherein the output means for receiving the signals from the heat detector means includes:
    amplifier means, for receiving the signals from the pickup means, and for generating output signals in accordance therewith, and
    visual indicator means, for receiving the signals from the amplifier means for generating a separate visual indication of the heat transfer characteristics of the incremental areas being scanned by each individual pickup means, and for generating a composite visual indication, from each of the separate visual indications, of the heat transfer characteristics of all of the incremental areas being scanned by all of the pickup means.

5. In a scanning apparatus for detecting a thermal response characteristic of a workpiece:
    means for focusing a beam of radiation onto an incremental area of a surface of the workpiece to heat the area;
    at least two radiation sensing devices, each for receiving radiation and for generating an electrical signal in accordance with the intensity of the received radiation which is in a predetermined range of radiation wavelengths;

means for focusing each radiation sensing device along an optical path and onto a separate and discrete incremental area of the surface of the workpiece in close, nonoverlapping proximity with the heated area, to generate an electrical signal from each sensing device in accordance with the intensity of the radiation emitted in the predetermined range of wavelengths by the incremental area onto which the sensing device is focused;

means for scanning the beam of radiation and the optical paths of the radiation sensing devices across the surface of the workpiece, with the heated incremental area and the sensed incremental areas maintained in a fixed spatial orientation with respect to each other and with not more than one of the radiation sensing devices sensing incremental areas of the surface which are scanned by the beam of radiation, to generate signals from the sensing devices which vary in accordance with the intensity of the radiation emitted in the predetermined range of wavelengths by the scanned incremental areas, and means for indicating the value of the electrical signals generated by the sensing devices as the optical paths of the sensing devices are scanned across the surface of the workpiece.

6. In a scanning apparatus as in claim 5, wherein:
each radiation sensing device is a radiometer, and the scanning means includes
a. a first plane mirror, adapted for oscillating movement in a first direction, and positioned both in the path of the beam of radiation, and in the optical paths of the radiometers, to scan the beam of radiation and the optical paths of the radiometers across the surface of the article in the first direction,
b. means for oscillating the first plane mirror in the first direction,
c. a second plane mirror, adapted for oscillating movement in a second direction, and positioned both in the path of the beam of radiation, and in the optical paths of the radiometers, to scan the beam of radiation and the optical paths of the radiometers across the surface of the article in the second direction, and
d. means for oscillating the second plane mirror in the second direction, and the means for indicating the value of the electrical signals generated by the radiometers includes
a. a multi-gun cathode ray tube, each gun of which receives an input, which varies in accordance with the electrical signal from a separate one of the radiometers, and generates on the screen of the tube a separate raster image which correspondingly varies in accordance with the electrical signal;
b. first sweep means, synchronously coupled with the means for oscillating the first plane mirror in the first direction, for sweeping the rasters, generated by the guns, across the screen of the tube in a direction which corresponds with the first direction, and
c. second sweep means, synchronously coupled with the means for oscillating the second plane mirror in the second direction, for sweeping the rasters, generated by the guns, across the screen of the tube in a direction which corresponds with the second direction, to generate a composite image on the screen of the tube, with each of the individual raster images, which is a representation of the thermal response experienced by the surface of the workpiece as it is scanned by the beam of radiation.

7. In a scanning apparatus as in claim 6, wherein the first and second directions are orthogonal with respect to each other.

8. In a nondestructive apparatus for detecting a thermal characteristic of an article:
means for focusing radiation from a source of radiation into a beam for projection onto an incremental area of a surface of the article to heat the area and, by the thermal conduction of the article, to heat the surrounding area;
at least three radiation pickup devices, each for sensing the intensity of radiation in a predetermined range of radiation wavelengths and for generating an electrical signal which varies in accordance with the intensity thereof;
means for focusing an image of a separate and discrete incremental area of the surface of the article adjacent to the heated area along an optical path and onto each pickup device for detection thereby to generate an electrical signal with each pickup device in accordance with the intensity of the radiation emitted in the predetermined range of wavelengths by its detected incremental area;
means for intermittently interrupting both the beam of radiation and the optical path to the pickup devices to pulse both the beam of radiation on the surface and the radiation detected by the pickup devices;
a first optical deflection device, both in the path of the beam of radiation and in the optical paths of the pickup devices, for repetitively sweeping both the beam of radiation and the image focused on each pickup device across the surface of the article in a first direction and in a fixed orientation with each other;
a second optical deflection device both in the path of the beam of radiation and the optical paths of the pickup devices, for repetitively sweeping both the beam of radiation and the image focused on each pickup device across the surface of the article in a second direction, which is orthogonal with the first direction, and in the fixed orientation with each other, to generate electrical signals with the pickup devices in accordance with the intensity of the radiation emitted in the predetermined range of wavelengths by the images of the incremental areas swept across the surface of the article by the first and second optical deflection devices;
a multi-input video display device, having a screen for displaying video information thereon, for receiving at each input a signal from a separate one of the pickup devices and for generating on separate areas of the screen a point image which varies in brightness in accordance with the value of the signal at one of the inputs, and therefore in accordance with the radiation sensed by one of the pickup devices, the point images being in a spatial registry which corresponds with the spatial registry of the images of the incremental areas detected by the pickup devices;

first sweep means, coupled with the first optical deflection device, for repetitively sweeping the point images across the screen of the display device in one direction, in synchronism with the sweep of the images focused on the pickup devices across the surface of the article in the first direction;

second sweep means, coupled with the second optical deflection device, for repetitively sweeping the point images across the screen in a direction orthogonal to the one direction, in synchronism with the sweep of the images focused on the pickup devices across the surface of the article in the second direction, so that as the point images are swept on the screen the brightness thereof varies in accordance with the intensity of the radiation detected by the pickup devices to display on the screen with each point image a separate visual representation of the radiation emissivity of the incremental areas of the surface of the article as detected by an associated one of the pickup devices, which separate images together form a composite visual representation of the radiation emissivity of the surface of the article detected by all of the pickup devices.

9. In an apparatus as set forth in claim 8, wherein:
each radiation pickup device is a radiometer;
the means for intermittently interrupting both the beam of radiation and the optical paths of the radiometers is a multi-bladed chopper, positioned for rotation across both the optical paths of the radiometers and the path of the beam of radiation;
the first and second optical deflection devices are first and second plane mirrors, each positioned both in the path of the beam of radiation and in the optical paths of the radiometers, and the mirrors being adapted for oscillating movement in directions which are orthogonal with respect to each other;
the multi-input video display device is a multi-gun cathode ray tube, each gun of which is for generating a point image which varies in brightness in accordance with the signal from a separate one of the radiometers;
the first sweep means is an $x$-deflection circuit for sweeping the beam from each gun in an $x$-direction, and
the second sweep means is a $y$-deflection circuit for sweeping the beam from each gun in a $y$-direction, the $y$-direction being orthogonal with respect to the $x$-direction.

10. In an apparatus as set forth in claim 9, further including:
a first piezoelectric device, coupled to the first plane mirror, for responding to a signal from the $x$-deflection circuit to impart oscillating movement to the first plane mirror in accordance therewith, and
a second piezoelectric device, coupled to the second plane mirror, for responding to a signal from the $y$-deflection circuit to impart oscillating movement to the second plane mirror in accordance therewith.

11. In a method of detecting a thermal characteristic of an article:
irradiating an incremental area of a surface of the article with a beam of energy to heat the area;

detecting the intensity of the thermal response in the same range of radiation wavelengths at at least two discrete incremental areas on the surface of the article adjacent to the heated area;

generating a separate electrical signal corresponding to the intensity of the thermal response at each detected incremental area;

scanning the heated incremental area and the detected incremental areas across the surface of the article to generate electrical signals which vary in accordance with the intensity of the thermal responses of the detected areas in the same range of radiation wavelengths, and indicating, in accordance with the value of the electrical signals, the thermal responses of the detected incremental areas scanned across the surface of the article.

12. In a method as set forth in claim 11, wherein:
the scanning step includes scanning the heated incremental area and the detected incremental areas, in a fixed spatial relationship with respect to each other, across the surface of the article in a predetermined path, and
the indicating step includes generating separate visual images, each of which is representative of the intensity of the thermal response detected at an individual one of the incremental areas scanned across the surface of the article, and each of which varies in brightness in accordance with the thermal responses of the detected incremental area, which separate images, taken together, form a composite image representative of the intensity of the thermal response at all of the scanned incremental areas.

13. In a method of nondestructively determining a thermal characteristic of a workpiece:
focusing a beam of radiant energy onto an incremental area of a surface of the workpiece to heat the area and, by the thermal conduction of the workpiece, to heat the area adjacent to the incremental heated area;

focusing an image of each of at least two discrete incremental areas on the surface of the workpiece onto a separate heat detection device;

generating an electrical signal, with each heat detection device, which is in accordance with the intensity of the thermal response in a predetermined range of radiation wavelengths of the incremental area the image of which is detected thereby, the intensity of the thermal response of each incremental area in the predetermined range of wavelengths being a function of the internal structure of the workpiece at and adjacent to the incremental area;

intermittently interrupting both the focused beam of radiant energy and the focused images of the incremental areas to pulse the beam on the incremental heated area of the surface and to pulse the image focused onto each heat detection device;

repetitively scanning both the focused beam and the focused images across the surface of the workpiece in a predetermined pattern and in a fixed spatial relationship with each other to generate electrical signals with the heat detection devices which vary in accordance with the intensity of the thermal responses of the detected incremental areas in the predetermined range of wavelengths;

forming a separate variable brightness point image on a screen, for each detected incremental area, which is in the same spatial relationship with respect to the other point images as is that detected incremental area with respect to the other detected incremental areas;

varying the brightness of each point image in accordance with the electrical signal generated by the heat detection device onto which is focused the image of the incremental area for which the point image is formed;

scanning the point images across the screen in the predetermined pattern, and in synchronism with the scanning of the focused images across the surface of the workpiece, to form on the screen a separate visual representation of the thermal response of the surface of the workpiece as detected by each heat detection device, which separate visual representations, taken together, form a composite visual representation of the thermal response of the surface as detected by all of the heat detection devices.

14. In a noncontacting apparatus for generating a thermal image of an article:

means for incrementally heating discrete areas of a surface of the article;

a pair of heat detector means, each for separately sensing the thermal radiation response in the same range of radiation wavelengths from an individual one of two discrete positions relative to the discrete heated areas and for generating signals in accordance therewith, and means responsive to the signals for displaying a thermal image of the article.

15. In an infrared scanning apparatus for detecting a thermal response of an article:

means for focusing a beam of infrared radiation onto an incremental area of a surface of the article to heat the incremental area and, through thermal conduction, to heat incremental areas of the article surrounding the heated incremental area;

three infrared radiation detecting devices, each for receiving infrared radiation and for generating an electrical signal which varies in accordance with the intensity of the received radiation which is in a predetermined range of radiation wavelengths;

means for focusing each radiation detecting device along an optical path and onto a separate and discrete incremental area on the surface of the article adjacent to and externally of the heated area to detect the radiation emitted by each conductively heated incremental area and to generate from each detecting device an electrical signal which varies in accordance with the intensity of the radiation emitted in the predetermined range of radiation wavelengths by the incremental area onto which the detecting device is focused, the centers of the detected incremental areas being successively positioned at 90° increments with respect to the center of the heated incremental area;

means for scanning both the beam of radiation and the optical paths of the radiation detecting devices across the surface of the article in a predetermined pattern, with the heated incremental area and the detected incremental areas maintained in a fixed spatial orientation with respect to each other and with not more than one of the radiation detecting devices detecting incremental areas of the surface which are scanned by the beam of radiation, to generate an electrical signal from each detecting device which varies in accordance with the intensity of the radiation in the predetermined range of radiation wavelengths emitted from the scanned incremental areas onto which the detecting device is focused;

a three gun cathode ray tube, each gun of which receives the electrical signal from an individual one of the radiation detecting devices and generates on the screen of the tube a point image which varies in brightness in accordance with the signal, the three guns together generating three discrete point images on the screen of the tube in a spatial orientation corresponding to the spatial orientation of the three detected incremental areas, and means for scanning the three point images across the screen of the tube in the predetermined pattern in a fixed spatial orientation with respect to each other and in synchronism with the scan of the three detected incremental areas across the surface of the article in the predetermined pattern, to generate with each point image a separate raster image representative of the radiation in the predetermined range of radiation wavelengths detected by an individual one of the detectors, the three separate images together forming a composite raster image of the radiation in the predetermined range of wavelengths detected by the three detectors.

* * * * *